Nov. 4, 1941.         W. S. SAUNDERS         2,261,504
                      ADJUSTABLE SUPPORT
                     Filed Nov. 20, 1939        2 Sheets-Sheet 1
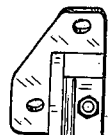
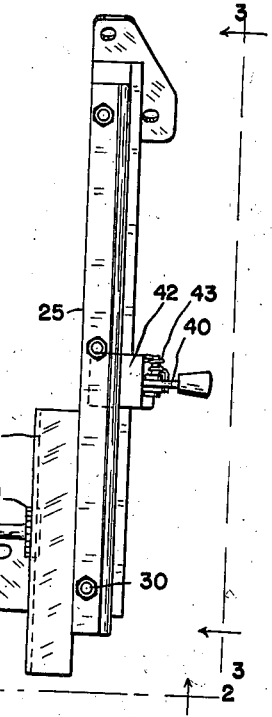
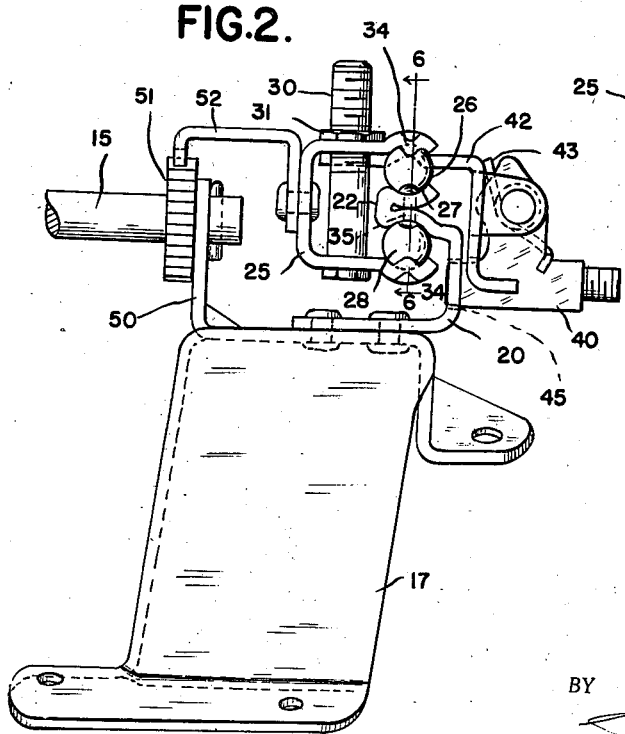
FIG.I.
FIG.2.
FIG.5.
INVENTOR.
WALTER S. SAUNDERS
BY
ATTORNEYS

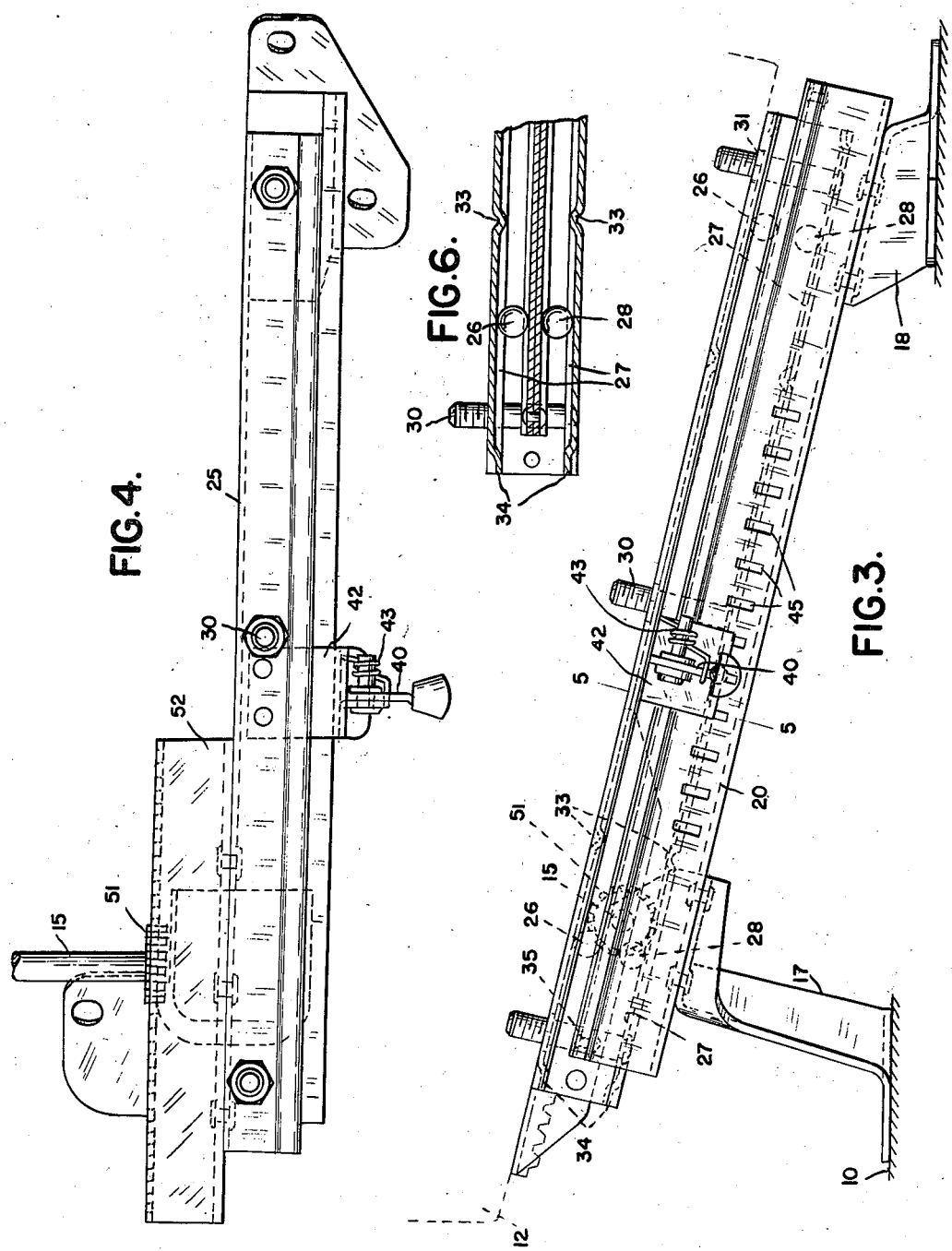

Patented Nov. 4, 1941

2,261,504

UNITED STATES PATENT OFFICE 2,261,504

ADJUSTABLE SUPPORT

Walter S. Saunders, Pontiac, Mich., assignor to American Forging and Socket Company, Pontiac, Mich., a corporation of Michigan Application November 20, 1939, Serial No. 305,301

4 Claims. (Cl. 155—14)

This invention relates to adjustable supporting devices for the seats of vehicles.

The competition between automobile manufacturers to create, and the constant desire on the part of the public to have, automobiles of improved performance and greater luxury, without increased cost, have necessitated the reduction of needless weight wherever possible throughout all parts of automotive vehicles, and the utmost economy is necessary, wherever possible, in the construction of parts which do not contribute directly to the factors of performance and comfort. In the construction of adjustable seat supports of the class to which the present invention appertains, sheet metal has become the almost universal material, because of its low cost, and the manner in which it lends itself to structures of light weight. Great difficulty has been encountered, however, in providing such sheet metal seat supports which are sufficiently rigid to hold the seat firmly under all conditions, yet which are easily adjustable when desired, and not apt to become clogged and stuck due to dirt or corrosion. Looseness due to wear and distortion of sheet metal parts has become more and more troublesome, due to the fact that the seats whose adjustable support is desired are constantly made wider and heavier, and are now called upon to accommodate at least three persons. Loading of the seat and its support is further increased by the rapid acceleration and quick stops of which the cars are capable. All of the enumerated factors, together with the occasional severe lurching, swaying and side forces due to rapid turning to which the heavily loaded seat is subjected, demand increased rigidity and strength in the seat supporting mechanisms, despite the aforementioned desire for light weight and economy in the construction of these devices. With the foregoing considerations in mind, the present invention aims to provide an improved seat supporting device of the character indicated which, although less expensive to construct than such devices as currently used, holds the supported seat more firmly against unwanted lost motion and rattling than is possible with presently known constructions of comparable cost.

A related object is to provide such a device utilizing ball bearings to minimize friction between the moving parts, yet in which the balls are so held, by means of extremely simple character, as to prevent rattling, looseness and/or escape thereof.

Still another object is to provide such a construction having an improved travelling seat supporting carriage, of novel construction, incorporating limitedly flexible bearing engaging portions, which constantly take up all clearance between the bearings and the track and carriage portions interconnected thereby, while yet firmly holding the parts against such movement as would cause unwanted drifting of the seat during operation of the vehicle.

Other objects and advantages will be apparent from the following description, wherein reference is made to the accompanying drawings illustrating a preferred embodiment of my invention and wherein similar reference numerals designate similar parts throughout the several views.

In the drawings:

Figure 1 is a plan view of a pair of seat supporting assemblies constructed in accordance with the present invention and arranged to cooperate in supporting the opposite ends of a vehicle seat, the seat being removed and the synchronizing shaft centrally broken away.

Figure 2 is a front elevational view taken substantially as indicated by the line and arrows 2—2 of Figure 1.

Figure 3 is a side elevational view taken substantially as indicated by the line and arrows 3—3 of Figure 1.

Figure 4 is an enlarged plan view of that one of the supporting assemblies which is provided with the seat locking means.

Figure 5 is a cross section taken substantially on the line 5—5 of Figure 3, and looking in the direction of the arrows; and Figure 6 is a sectional detail taken substantially on the line 6—6 of Figure 2, and looking in the direction of the arrows.

Referring now to the drawings:

Reference character 10 designates the floor of the vehicle, and 12 indicates a seat adjustably supported thereupon by my improved supporting mechanism, these parts being illustrated only fragmentarily. The supporting mechanism comprises two spaced assemblies secured to the floor in the manner shown in plan in Figure 1, so that one is arranged beneath each end of the seat. Since the two supporting assemblies are similar to each other in construction, detailed description of one will suffice, and the description will be directed to that assembly which is provided with the locking means by which the carriages of both units are normally held against travel. The locking effect is transmitted to the carriage of the other assembly through the agency of a cross-connecting and synchronizing shaft 15.

The fixed portions of the support consist of a track assembly, generally designated 20, mounted upon brackets or legs 17, 18 attached to the floor. The substantially right angular cross sectional contour of the track is best shown in Figures 2 and 5. The sheet metal of which it is formed is also bent inwardly at its top, and folded to provide an inturned top flange 22 of double thickness. The folded portions thus provided are longitudinally curved to form channels or troughs extending along both the top and bottom thereof, adapted to serve as ball races.

A seat-supporting carriage assembly, generally designated 25, is movable along the track and carried by balls 26, arranged in the top trough of the horizontal track flange 22. The body of the carriage is a sheet metal channel, turned on its side and with one of its side webs overhanging and the other underhanging the horizontal track flange. Near their free edges, the horizontally projecting webs of the carriage channel are longitudinally troughed, as at 27, to accommodate the balls 26, 28. The balls 28, arranged beneath the track and fitting in the complementary races formed in the lower portions of the track and carriage, serve to prevent upward movement of the seat and to take up all clearance between the track, carriage and balls. The balls and the parts engaged thereby are of such size that the sides of the channel are maintained slightly flexed at all times, to exert constant tension upon and take up all looseness between the parts.

Bolts 30 project vertically through the side webs of the channel-shaped track, and serve as attaching means for the seat 12, a nut 31 being arranged between the track and the seat carried thereby, to enable adjustment of the above mentioned tension, and take-up effect, of the webs of the carriage. Struck-in portions 33, 34, formed in the carriage, limit the travel of the balls and so of the seat, while additional abutments, at the ends of the track flange 22, are provided by rivets 35, projecting through the folded portion of the track flange and having heads extending into both the upper and lower ball channels thereof to block the balls and prevent their rolling from the ends of the track.

The locking means comprises a dog, 40, pivoted upon a bracket 42 attached to and projecting laterally from the carriage, as shown in Figures 2 and 5. A spring 43 constantly urges the dog toward a position in which it projects through a slot in the bracket and into engagement with any one of a series of apertures 45 formed to receive it in the side of the track.

The cross shaft 15 is journaled at its ends in upwardly projecting bracket portions 50 carried by the front legs 17 of the opposed units forming the complete seat supporting means, and a pinion 51 near each end of the shaft meshes with a rack 52 riveted or otherwise attached to the side of the carriage and provided with a down-turned toothed flange for engagement with the gear.

In assembling the carriage upon the track assembly, the lower set of balls may first be inserted in the bottom channels of the carriage, after which the carriage is placed in proper position, without the upper balls, which may then be pushed into their races simply by sliding the carriage along until it projects from one end sufficiently. The carriage is shown in such a position in Figure 3. This will be seen to permit pushing the balls into the space between the complementary channels by forcing them between the upper abutment 34 of the carriage and rivet 35. This entails some flexure of the carriage, so that the balls are snugly held when positioned. Similar insertion of the rear upper ball is effected by sliding the carriage until its rear end projects from the track.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A seat supporting device comprising a sheet metal track element adapted to be attached to a floor and having a laterally projecting track flange formed by folding one edge thereof to multiple thickness, the outer of said thicknesses being channeled longitudinally to provide races for anti-friction members, a carriage movable over the track element and adapted to support a seat or the like, a pair of laterally extending sheet metal flanges supported by said carriage, one underlying and the other overlying said track flange, each of said flanges of the carriage having a trough forming a complementary race facing and substantially aligned with one of the races formed by said channels in the track flange, anti-friction members arranged between said track flange and each of said flanges in the carriage, and retained in the complementary races formed by said channels and troughs, to facilitate longitudinal movement of the carriage along the track element while preventing unwanted vertical and lateral movement of the carriage with relation to the track element, said flanges of the carriage being laterally flexible toward and from one another and maintained under constant tension, tending to spread the same farther apart than their normal relaxed relation, by said anti-friction members, abutments extending toward the track flange from each of said flanges of the carriage and located adjacent the ends of said troughs, and cooperating abutments carried by the track flange located adjacent the ends of said channels and extending toward each of the flanges of the carriage, said abutments tending to prevent escape of the anti-friction members from said complementary races, the ends of said carriage and track element being otherwise unobstructed at the portions defining said races, whereby the anti-friction members may be inserted in said races by moving the carriage to such position that the abutments carried thereby lie beyond the ends of the races of the track element.

2. An adjustable supporting device comprising a track element adapted to be attached to a floor and having a laterally projecting longitudinally extending track flange, said flange having substantially vertically aligned channels extending longitudinally of its upper and lower surfaces, a carriage adapted to support a seat or the like comprising a sheet metal member of substantially channel form extending substantially parallel to said track flange and having one of its side webs spacedly overlying and the other of its side webs spacedly underlying said track flange, anti-friction members interposed between each of said side webs and the track flange and supporting the carriage against unwanted movement either upwardly or downwardly with respect to the track element, the side webs of said carriage being flexible toward and from one another and maintained under stress tending to spread the same apart by said anti-friction members, thereby eliminating unwanted looseness between said carriage, anti-friction members and track element, and adjustable tensioning means extending through and acting upon said side webs.

3. An adjustable supporting device comprising a track element adapted to be attached to a floor and having a laterally projecting longitudinally extending track flange, a carriage adapted to support a seat or the like comprising a sheet metal member of substantially channel form extending generally parallel to said track flange and having one of its side webs spacedly overlying and the other of its side webs spacedly underlying said track flange, anti-friction members interposed between each of said side webs and the track flange and supporting the carriage against unwanted movement either upwardly or downwardly with respect to the track element, the side webs of said carriage being flexible toward and from one another and maintained under stress tending to spread the same apart by said anti-friction members, thereby eliminating unwanted looseness between said carriage, anti-friction members and track element; seat securing means extending substantially transversely through the side webs of said carriage, and adjustable means carried by said seat securing means for imposing variable closing stress upon said side webs.

4. An adjustable supporting device comprising a track element adapted to be attached to a floor and having a laterally projecting longitudinally extending track flange, a carriage adapted to support a seat or the like comprising a sheet metal member of substantially channel form extending generally parallel to said track flange and having one of its side webs spacedly overlying and the other of its side webs spacedly underlying said track flange, anti-friction members interposed between each of said side webs and the track flange and supporting the carriage against unwanted movement either upwardly or downwardly with respect to the track element, the side webs of said carriage being flexible toward and from one another and maintained under stress tending to spread the same apart by said anti-friction members, thereby eliminating unwanted looseness between said carriage, anti-friction members and track element; a screw threaded seat securing element extending substantially vertically and transversely through said side webs of the carriage, and a threaded nut fitted on said element and reacting against said webs, whereby an adjustable closing effort may be exerted upon said side webs.

WALTER S. SAUNDERS.